United States Patent [19]

Kennedy

[11] 4,119,708
[45] Oct. 10, 1978

[54] HIGH TEMPERATURE, HIGH PRESSURE PROCESS UTILIZING A DUCTILE DRIVER ELEMENT

[75] Inventor: George C. Kennedy, Los Angeles, Calif.

[73] Assignee: Kennametal Inc., Latrobe, Pa.

[21] Appl. No.: 727,889

[22] Filed: Sep. 29, 1976

Related U.S. Application Data

[62] Division of Ser. No. 586,415, Jun. 12, 1975, abandoned.

[51] Int. Cl.² ............................................ C01B 31/06
[52] U.S. Cl. ..................................... 423/659; 423/446; 425/DIG. 26
[58] Field of Search ................... 423/446, 659; 425/77, 425/DIG. 26, 352, 353

[56] References Cited

U.S. PATENT DOCUMENTS

| 3,350,743 | 11/1967 | Ishizuka | 425/77 |
| 3,365,751 | 1/1968 | Ishizuka | 425/77 |
| 3,676,069 | 8/1970 | Kennedy | 423/446 |
| 3,727,028 | 4/1973 | Kuratomi | 425/77 |

Primary Examiner—Edward J. Meros
Attorney, Agent, or Firm—Lawrence R. Burns

[57] ABSTRACT

A high pressure, high temperature, piston-cylinder type apparatus utilizing a soft, ductile, electrically conductive material as a driver element to transmit pressure from the piston to a charge in the cylinder. The driver element, preferably made of lead, or the like, is placed in the pressure cylinder between an advanceable piston and a stationary sleeve of insulating material surrounding an electrically heatable core of charge material. As the piston is advanced, the lead driver element deforms into the end of the sleeve of insulating material and maintains pressure on the core without deformation of the sleeve of insulating material.

3 Claims, 4 Drawing Figures

HIGH TEMPERATURE, HIGH PRESSURE PROCESS UTILIZING A DUCTILE DRIVER ELEMENT

RELATED APPLICATION

The present application is a Division of U.S. Ser. No. 586,415, filed June 12, 1975 now abandoned, entitled "HIGH TEMPERATURE, HIGH PRESSURE APPARATUS HAVING A DUCTILE DRIVER ELEMENT," Inventor George C. Kennedy.

BACKGROUND OF THE INVENTION

High pressure, high temperature piston-cylinder apparatus are used for a variety of purposes and, specifically, for the production of diamond crystals. In such apparatus, a core of charge material; in the case of diamonds, graphite and a carbon solvent metal; is confined within a reaction chamber in the form of a cylinder and is heated and subjected to pressure therein.

Between the cylinder and core of charge material, there is placed a surrounding sleeve of electrical insulating material, and the charge is heated by passing an electric current therethrough. The sleeve inhibits the transfer of heat outward from the core to the cylinder and surrounding apparatus and confines the heating current to the core.

The insulating material is generally cylindrical, fitting closely within the inside diameter of the cylinder and extending to near the ends of the cylinder. The core of charge material is usually tightly fitted within the insulation material, and may also be cylindrical in shape. One end of the cylinder is closed and the piston fits in the open end of the cylinder and is advanceable into the cylinder in the direction toward the closed end of the cylinder. The inside diameter of the piston cylinder and the outside diameter of the piston that fits into the cylinder usually form a snug sliding fit respectively with each other.

With the core of charge material placed in the cylinder and the insulation and piston in place, electrical heating of the core of charge material takes place by passing electrical current from the closed end of the cylinder, through the core of charge material and on through the piston, thereby heating the core of charge material to any desired temperature upon command by the operator. Pressure in the cylinder is increased by advancing the piston into the cylinder at a controlled rate and with a known force exerted on the piston.

In the manufacture of diamonds, it is not only extremely important to know the precise temperature and pressure conditions on the core of charge material, but also to insure that the temperature and pressure conditions are constant throughout the entire core of charge material. It is known in the industry that if a core of graphite and carbon solvent are placed in the cylinder and subjected to sufficient pressure and temperature, diamond crystals will result. The size and quality of the diamond crystals can vary depending upon how well and uniformly the growth conditions of temperature and pressure are held within the cylinder.

One of the problems associated with the growth of diamonds in a piston-cylinder apparatus is the problem of compensation for the volume change that takes place as a result of the conversion of carbon from graphite form to diamond form. There is a significant difference in the density of diamond and the density of graphite. The density of diamond is about 3.5 while the density of graphite is only about 2.25.

Thus, when the sufficient temperature and pressure conditions are present and the graphite begins converting into diamond, there is a corresponding reduction of volume in the core of charge material. As mentioned earlier, since the pressure must be kept constant, then the piston has to be advanced into the cylinder as the volume reduction is occurring.

In all prior art machines, the insulating material is located between the inside diameter of the cylinder and the core of charge material. The insulating material is ideally of constant cross section throughout its length to maintain uniform current density through the charge and has uniform wall thickness such that no temperature gradients build up inside or along the core of charge material.

If the above conditions are not maintained during the complete cycle of the process, the relative temperature in the core would vary and "cold" or "hot" spots will build up in the core of charge materials during the reaction and thereby hinder the quality of diamond crystals produced by the fact that the temperature is not held at a known value for a given period of time.

In these prior art machines, and by the very nature of the diamond crystals forming from graphite, the piston must advance into the cylinder. As the piston advances into the cylinder, since it is a snug sliding fit with the inside diameter of the cylinder, it necessarily begins to crush the insulating liner. The radially outward edges of the piston contact the insulating material and begin to buckle or compress it along with the core material.

When the buckling or compression of the insulating material occurs, uniform current density is not maintained through the core of charge material and the wall thickness of the insulating material between the core of charge material and the cylinder wall is not uniform. When the uniform conditions are not maintained, hot and cold spots now develop throughout the core of charge material. This effect is necessarily detrimental to the controlled formation of uniform size and quality diamonds.

In the known "belt" type high pressure apparatus, the pistons taper inwardly toward the charge and the ends of the cylinder in which the charge is disposed are correspondingly tapered. Gaskets formed of deformable electrical insulating material, such as pyrophyllite, are disposed between the tapered pistons and the tapered ends of the cylinder and seal the charge in the cylinder.

The gaskets must deform to permit the piston to advance into the cylinder to compact the charge, and the tapered configuration of the pistons and cylinder ends present a substantial area which absorbs load from the pistons while limiting the amount the pistons can advance into the cylinder.

BRIEF SUMMARY OF THE INVENTION

According to the present invention, a preferably lead driver slug is placed in the cylinder between the forward end of the piston and the insulation material. The material in front of the piston need not be lead, but it must be relatively soft, when compared to the insulating material, ductile and electrically conductive. The driver slug must be so sized as to allow the piston maximum forward travel without engagement with the insulating material. In the case of diamond making, as the conversion of graphite to diamond occurs, the volume of charge shrinks and the piston must be advanced to maintain constant pressure.

As the piston advances with the driver slug preceding the piston, the driver slug, having a low flow strength in comparison with the insulating material, deforms to fit the inside diameter of the insulating material and flows inside of the insulating material rather than forcing deformation of the insulating material. In this way, the insulating material remains dimensionally stable around the core of charge, pinching and swelling do not occur and, therefore, no hot or cold spots develop in the charge.

The pressure in the charge is maintained very precisely and independently of the piston travel. Thus, with the pressure and electrical-thermal insulation being well defined and not a function of piston advancement, better diamond synthesis conditions can be maintained with the relatively large volume change taking place during diamond synthesis.

The exact nature of the present invention will become more apparent upon reference to the following detailed specification taken in connection with the accompanying drawings in which.

DETAILED DESCRIPTION OF THE INVENTION

Figure 1:
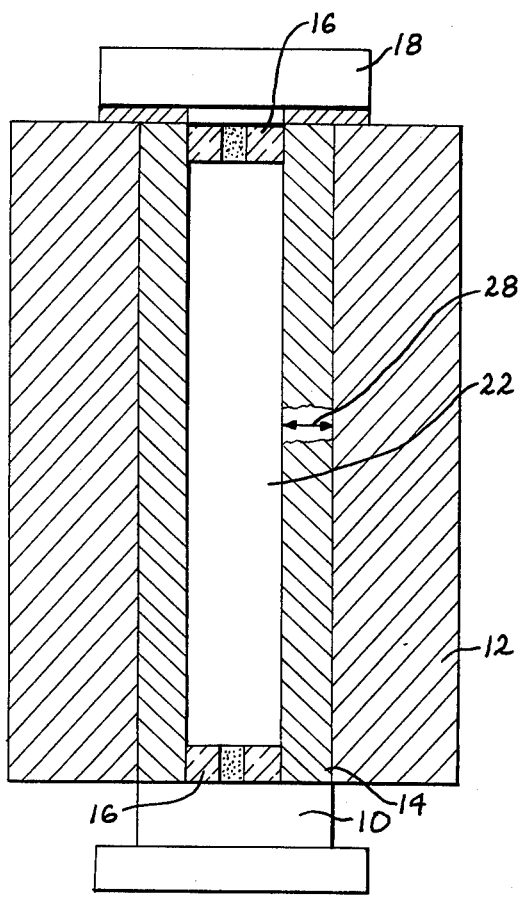
FIG. 1 is a side view of prior art piston cylinder arrangement before pressurization.

In FIG. 1 is shown a prior art arrangement for heating and pressurizing a core of charge material 22. The core of charge material 22 is placed in cylinder 12 having an immovable or stationary piston 18 closing one end of cylinder 12 and insulated therefrom by electrical insulation 16. Between the core of charge material 22 and the inside diameter of cylinder 12 is placed insulation 28. Insulation 28 extends nearly the entire length of the inside diameter of cylinder 12 in a cylindrical form. Movable piston 10 just fits inside cylinder 12. The outside diameter of the insulation material 28 usually has a close slip fit with the inside diameter of cylinder 12.

Elements 16 are current and pressure transmitters to facilitate electrical heating of the core of charge material 22. An electric current is passed through stationary piston 18 to the current and pressure transmitter 16.

The current passes from upper transmitter 16 through the core of charge material 22 to lower current and pressure transmitter. The current is then further passes through movable piston 10 to complete the circuit.

Movable piston 10 is aligned with the inside diameter of cylinder 12 and provides a small clearance fit with the inside diameter of the cylinder. As seen from FIG. 1, the insulating material 28 extends nearly all the way to the face of both piston 10 and 18 to prevent any excess heat loss.

Pressurization is achieved by advancing movable piston 10 into cylinder 12 toward stationary piston 18. The insulating material 14 has a uniform thickness throughout as pictured in 28. The core of charge material is then heated to the required temperature for the reaction to occur.

Figure 2:
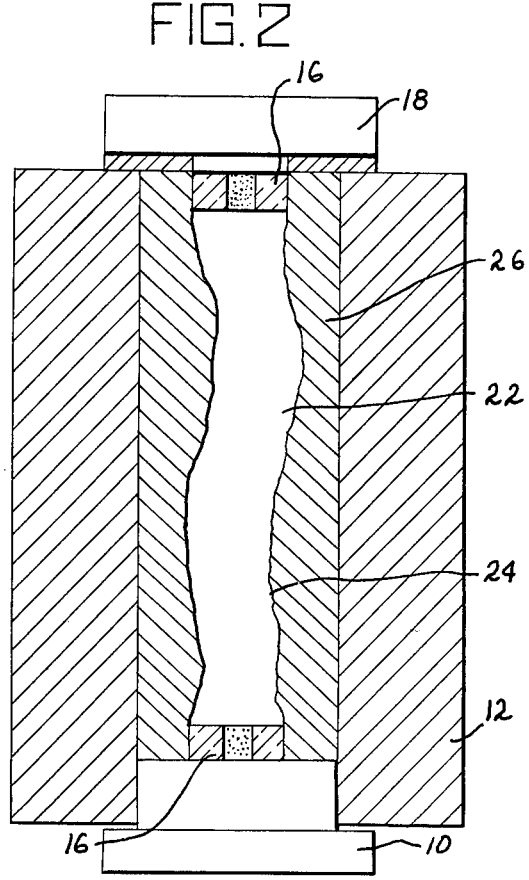
FIG. 2 is a side view of prior art piston cylinder arrangement after pressurization.

Referring to FIG. 2, the condition of the core of charge material 22 and the insulating material 14 may be seen after the reaction has taken place. In the usual formation of diamond crystals in apparatus of the type illustrated, the core of charge material will be a mixture of graphite and a carbon solvent and the insulating material could, for example, be pyrophyllite. The sequence of events that could take place would be pressurization of the core 22 to a sufficient pressure above the diamond graphite equilibrium line and then heating of the core of charge material 22 to a sufficient temperature to start the conversion from graphite to diamond.

The temperature is very important depending on the quality of diamond crystals desired. Therefore, what occurs in FIG. 2 is that the movable piston 10 is advanced into cylinder 12 until the desired pressure is reached. The movement or advancement of piston 10 initiated the deforming and buckling of insulating material 28. Once sufficient pressure was reached, the core was heated to sufficient temperature to start the conversion of graphite to diamond, and a constant force is kept on piston 10 to maintain a steady pressure. Inside the core of charge material, during the reaction, volume is being reduced because diamonds are about 56 percent more dense than graphite.

Therefore, as the reaction occurs, piston 10 advanced further into the cylinder 12 because a constant driving force is being kept on it. This movement further deforms insulating material 28 such that it bulges as at 24 and is thinner as at 26. The bulging at 24 increases the current density through the core and reduces the amount of heat carried out through the walls of the cylinder, causing the relative temperature in the core to become hotter in the region of 24.

In the meantime, the relative thinness of the insulation material at 26 decreases the current density through the core and allows more rapid heat transfer out to the walls of the cylinder 12 thereby reducing the relative temperature of the core 22 in region 26.

These are the regions of "hot" and "cold" spots, respectively, that the present invention avoids or minimizes to a great extent. Usually, in presses of these kinds, it is very difficult to measure temperature directly, so the temperature is usually estimated from past experience, and the amount of heat input into the core of charge material. If these cold and hot spots develop, it becomes impossible to determine the temperature of the reaction in order to control the quality of the end product of diamond crystals.

Figure 3:
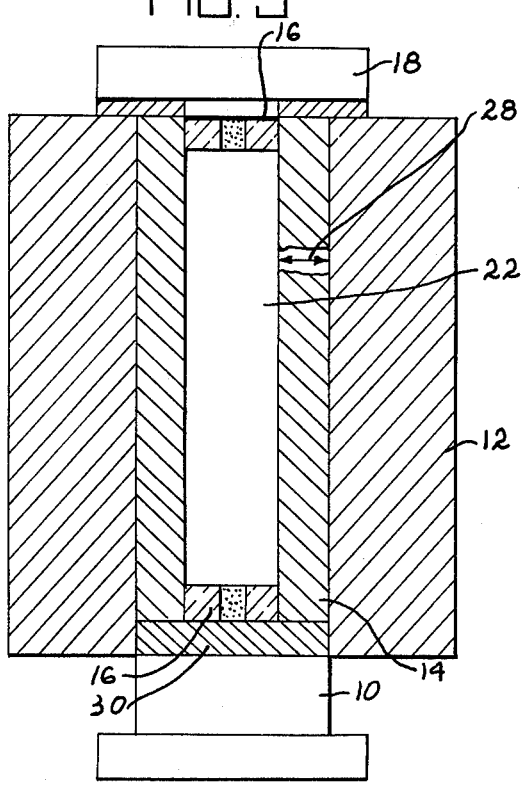
FIG. 3 is a side view of the present invention piston cylinder arrangement with driver slug before pressurization.

In FIG. 3 is shown the arrangement of the present invention before pressurization takes place. After pressurization, heating is accomplished as described previously by passing current through stationary piston 18, current and pressure transmitter, core of charge material 22, driver element 30 and movable piston 10. It is necessary for the driver element to be electrically conductive in order to complete the circuit required for heating the core of charge material.

Originally, it is in solid state and has a cylindrical configuration with its diameter approximately equal to the inside diameter of cylinder 12. An additional feature of lead and an extremely preferable feature here is that the material have a very low thermal conductivity factor. Thus, it additionally helps contain heat in the core of charge material 22 rather than help dissipate the heat outward.

This driver element in its solid state is confined between the movable piston 10 and the insulating material 14 and current and pressure transmitter 16. When pressurization begins by movement of the piston 10 inward, there is no axial force exerted on the ends radially outward of insulating material 28 sufficient to deform the material. The driver element deforms around the edges of the sleeve of insulating material 28 and into the center of the sleeve. The important feature here is that any material chosen, while it must already be electrically conductive, must also have low flow strength in comparison to the flow strength of the insulating material of the sleeve.

Figure 4:
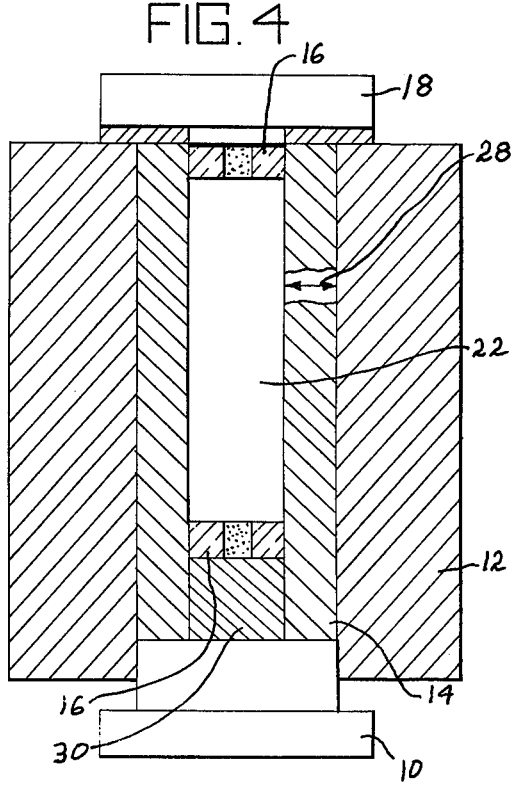
FIG. 4 is a side view of the present invention piston cylinder arrangement with driver slug after pressurization.

In FIG. 4 is shown the arrangement of the present invention after the total reaction has taken place. Movable piston 10 has moved inward into proximity with the bottom of the sleeve 28 and the driver element 30 has been deformed into the center of the sleeve 14. What is shown is, of course, an extreme position of the piston. The piston may normally not have to travel into contact or even near the bottom of the sleeve. The amount of lead to be used or required can be predetermined by one skilled in the art depending upon the dimensions of the apparatus to be used.

The main feature, however, is that the sleeve of insulating material 14 will have a nearly uniform thickness 28 throughout after the reaction instead of a buckled and pinched configuration as shown in FIG. 2, and the core of the charge material will have a uniform cross sectional area throughout its length.

Further, the piston 10 can follow the volume change of the charge and thereby maintain constant reaction pressure on the charge for a prolonged period of time.

Further modifications may be made within the scope of the appended claims.

What is claimed is:

1. The method of maintaining a desired pressure in a reaction chamber on an electrically heated charge which undergoes reaction and reduces in volume, said method comprising the steps of: lining a portion of the inside walls of the reaction chamber with a sleeve of insulating material, placing said charge in said sleeve and confining said charge and said sleeve axially at one end of the reaction chamber, introducing a ductile electrically conductive driver element and a piston into the reaction chamber so as to axially confine said charge and said sleeve in said reaction chamber, interposing said driver element between said piston and said sleeve, and heating and pressurizing said charge so that as the piston advances towards said charge the driver element will deform at a lower pressure and temperature than said sleeve and flow into the adjacent end of the sleeve, without substantially deformation of said sleeve during the continued advancement of said piston required for said reaction, and sizing the driver element to allow the piston maximum forward travel without substantial deformable engagement with said insulating sleeve while maintaining a substantially constant reaction pressure on the charge.

2. The method of maintaining a desired pressure in a reaction chamber on a charge which undergoes reaction and reduces in volume, said method comprising the steps of: lining a portion of the inside walls of the reaction chamber with a sleeve of electrical insulating material, placing said charge in said sleeve and confining said charge and said sleeve axially at one end of the reaction chamber, introducing a ductile electrically conductive driver element and a piston having a smooth sliding fit with the inside diameter of the reaction chamber so as to axially confine said charge in said reaction chamber, and interposing said driver element between said piston and said sleeve, pressurizing said charge by advancing the piston towards the charge so that said driver element will deform at a lower pressure than said sleeve and flow into the adjacent end of the sleeve without substantially deformation of the sleeve during continued advancement of said piston required for said reaction, and sizing the driver element to allow the piston maximum forward travel without substantial deformable engagement with said insulating sleeve while maintaining a substantially constant reaction pressure on the charge.

3. The method of maintaining a more uniform temperature along the length of an electrically heated charge which undergoes reaction and reduces in volume, said method comprising the steps of: lining a portion of the inside walls of the reaction chamber with a sleeve of electrical insulating material, placing said charge in said sleeve and confining said charge and said sleeve axially at one end of the reaction chamber, introducing a ductile, electrically conductive driver element and a piston having a smooth sliding fit with the inside diameter of the reaction chamber so as to axially confine said charge in said reaction chamber, and interposing said driver element between said piston and said sleeve, heating and pressurizing said charge so that as the piston advances towards said charge the driver element will deform at a lower pressure and temperature than said sleeve and flow into the adjacent end of the sleeve without substantially deformation of the sleeve during continued advancement of said piston required for said reaction, and sizing the driver element to allow the piston maximum forward travel without substantial deformable engagement with said insulating sleeve while maintaining a substantially constant reaction pressure on the charge.

* * * * *